US012577889B2

(12) United States Patent
Yang et al.

(10) Patent No.: US 12,577,889 B2
(45) Date of Patent: Mar. 17, 2026

(54) VIBRATION SUPPRESSION OF TURBINE BLADE

(71) Applicants: SHANGHAI JIAO TONG UNIVERSITY, Shanghai (CN); IHI Corporation, Tokyo (JP)

(72) Inventors: Mingyang Yang, Shanghai (CN); Lei Pan, Shanghai (CN); Wataru Sato, Tokyo (JP); Shota Murae, Tokyo (JP); Kangyao Deng, Shanghai (CN)

( * ) Notice: Subject to any disclaimer, the term of this patent is extended or adjusted under 35 U.S.C. 154(b) by 0 days.

(21) Appl. No.: 19/188,027

(22) Filed: Apr. 24, 2025

(65) Prior Publication Data

US 2025/0264037 A1 Aug. 21, 2025

Related U.S. Application Data

(63) Continuation of application No. PCT/JP2023/039508, filed on Nov. 1, 2023.

(30) Foreign Application Priority Data

Nov. 1, 2022 (CN) ......................... 202211353459.0

(51) Int. Cl.
*F01D 25/06* (2006.01)
*F01D 25/24* (2006.01)

(52) U.S. Cl.
CPC ............. *F01D 25/06* (2013.01); *F01D 25/24* (2013.01); *F05D 2240/12* (2013.01); *F05D 2240/304* (2013.01); *F05D 2260/96* (2013.01)

(58) Field of Classification Search
CPC . F01D 25/06; F01D 5/143; F01D 5/10; F05D 2220/12; F05D 2240/304; F05D 2260/96
See application file for complete search history.

(56) References Cited

U.S. PATENT DOCUMENTS 5,584,181 A 12/1996 Jinnouchi
8,915,699 B2 * 12/2014 Brignole ............... F04D 29/526 415/914

(Continued)

FOREIGN PATENT DOCUMENTS

JP H8-232671 9/1996
JP 2008-163761 7/2008

(Continued)

OTHER PUBLICATIONS

International Preliminary Report on Patentability with Written Opinion dated May 15, 2025 for PCT/JP2023/039508.

(Continued)

*Primary Examiner* — Nathaniel E Wiehe
*Assistant Examiner* — Maxime M Adjagbe
(74) *Attorney, Agent, or Firm* — SHIPWAY IP

(57) ABSTRACT

A turbine body includes a turbine rotor having a blade to rotate around an axis of rotation, and a housing including an inner wall surface surrounding the turbine rotor. During a rotation of the turbine rotor, a fluid is directed from a leading edge of the blade toward a trailing edge of the blade, and the blade is imparted with a first excitation force in response to the rotation of the turbine rotor. The inner wall surface has a plurality of grooves arranged along a circumferential direction that are positioned to intermittently face the trailing edge of the blade when the turbine rotor rotates, to generate a second excitation force that suppresses the first excitation force.

20 Claims, 9 Drawing Sheets

(56) References Cited

U.S. PATENT DOCUMENTS 10,760,437 B2 * 9/2020 Smith ..................... F02B 33/40
2006/0088412 A1 4/2006 Barton et al.

FOREIGN PATENT DOCUMENTS

JP 2014-066150 4/2014
WO 2018/222141 12/2018
WO WO-2021214928 A1 * 10/2021 ............. F01D 25/30

OTHER PUBLICATIONS

International Search Report dated Jan. 16, 2024 for PCT/JP2023/039508.

* cited by examiner

VIBRATION SUPPRESSION OF TURBINE BLADE

CROSS-REFERENCE TO RELATED APPLICATIONS

This application is a continuation application of PCT Application No. PCT/JP2023/039508, filed on Nov. 1, 2023, which claims the benefit of priority from Chinese Patent Application No. 202211353459.0, filed on Nov. 1, 2022, the entire contents of which are incorporated herein by reference.

BACKGROUND

Radial turbines are widely used in the field of turbochargers, micro gas turbines, and the like. The reliability of the blade of a radial turbine is an important element that affects the safe operation of the turbine.

The flow field of a volute outlet distorts circumferentially, so that surface pressure on the blade periodically changes during the rotation of the impeller. In a case where the turbine is operated at a specific rotational speed, the blade may resonate, causing a rapid increase in vibrational stress, which may damage the blade due to high cycle fatigue.

Methods to change the geometric shape of the volute and methods to adjust the thickness distribution of the blade are currently widely used as methods for suppressing the vibration of the radial turbine blade. The former suppresses the circumferential distortion of the flow field at the volute outlet by adjusting the circumferential distribution of the cross-sectional area of the volute or by changing the geometric shape of a scroll tongue portion, and the latter suppresses the concentration of stress by adjusting the distribution of the thickness of the blade. However, these methods may be time consuming, reduce versatility, and/or affect turbine performance.

SUMMARY

According to an example, a flow control method for suppressing a vibration of a radial turbine blade on the basis of a wall surface grooving treatment includes a grooving treatment on a housing wall surface of a radial turbine to suppress vibrational stress of blade resonance, with negligible impact on the aerodynamic performance of the turbine, while maintaining a simple structure and offer versatility.

DETAILED DESCRIPTION

Figure 1:
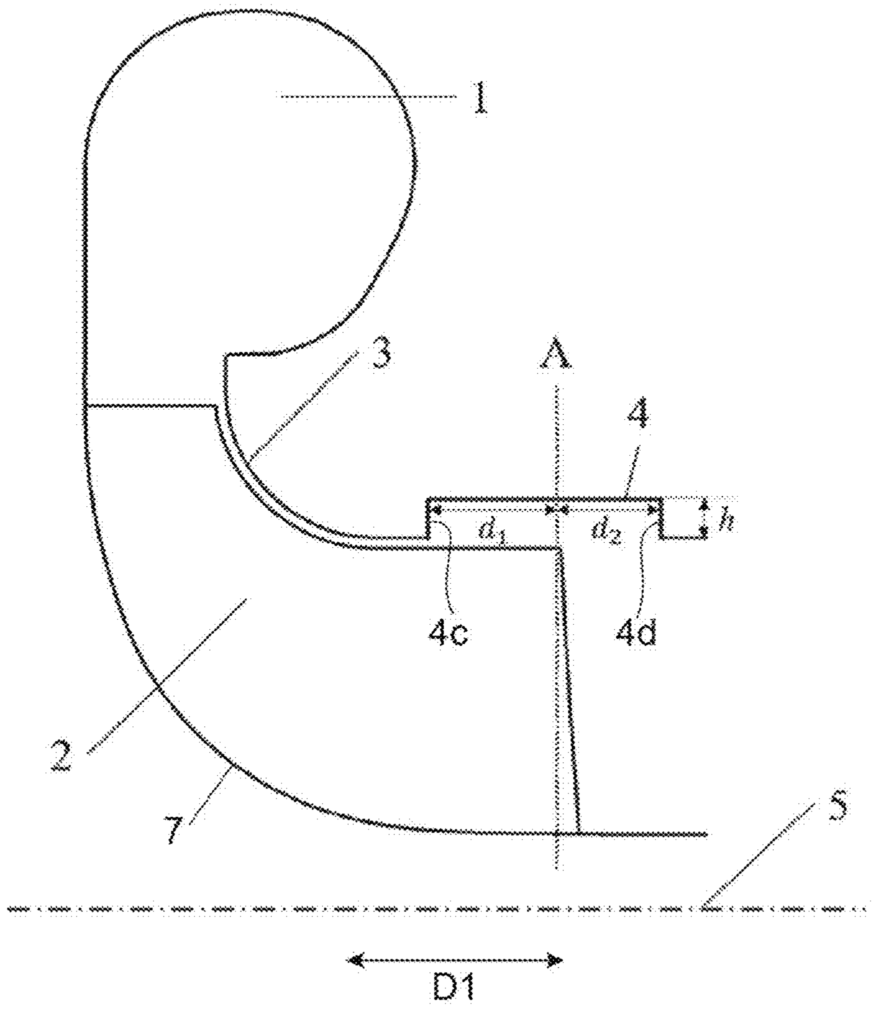
FIG. 1 is a schematic axial cross-sectional view of an example turbine body, illustrating a radial turbine blade within a housing.

The present disclosure describes a flow control method for suppressing a vibration of a radial turbine blade on the basis of a wall surface grooving treatment.

For example, a grooving treatment is carried out on a housing wall surface of a radial turbine to suppress vibrational stress of blade resonance.

In some examples, the groove formed in the housing is an inclined groove, a direction of the inclined groove being parallel to a blade, and the inclined groove being located in the vicinity of a trailing edge of the blade.

In some examples, a plurality of the inclined grooves are evenly disposed in a circumferential direction.

In some examples, a dimension parameter of each of the inclined grooves is adjusted such that an intensity of an aerodynamic excitation force generated by each of the inclined grooves is substantially the same as an intensity of an aerodynamic excitation force generated by a volute.

In some examples, the number of the inclined grooves and a relative location between each of the inclined grooves and the volute are adjusted such that the aerodynamic excitation forces generated by the volute and each of the inclined grooves have opposite phases and cancel each other.

Hereinafter, with reference to the drawings, the same elements or similar elements having the same function are denoted by the same reference numerals, and redundant description will be omitted.

As illustrated in FIG. 1, a radial turbine (or turbine body) includes a volute portion 1, and an impeller (or turbine rotor) 7 that is rotatable around an axis of rotation 5 to direct a fluid downstream from the volute portion 1 through the impeller or turbine rotor 7. An inclined groove 4 is formed in a housing wall surface 3 by machining. The inclined groove 4 is located in the vicinity of a trailing edge of the blade 2 of the impeller 7, and has a height (depth) of h in a radial direction of the axis of rotation 5. With the trailing edge of the blade 2 being a boundary line, the length of the inclined groove 4 in an axial direction D1 of an upstream portion of the boundary line is $d_1$, and the length in the axial direction D1 of a downstream portion of the boundary line is $d_2$. The groove 4 is open toward the turbine rotor 7 along the entire length ($d_1$, $d_2$) of the groove 4. In addition, the groove 4 extend within a portion of the inner wall surface 3*a* that extends in the axial direction D1, parallel to the axis of rotation 5.

Figure 2:
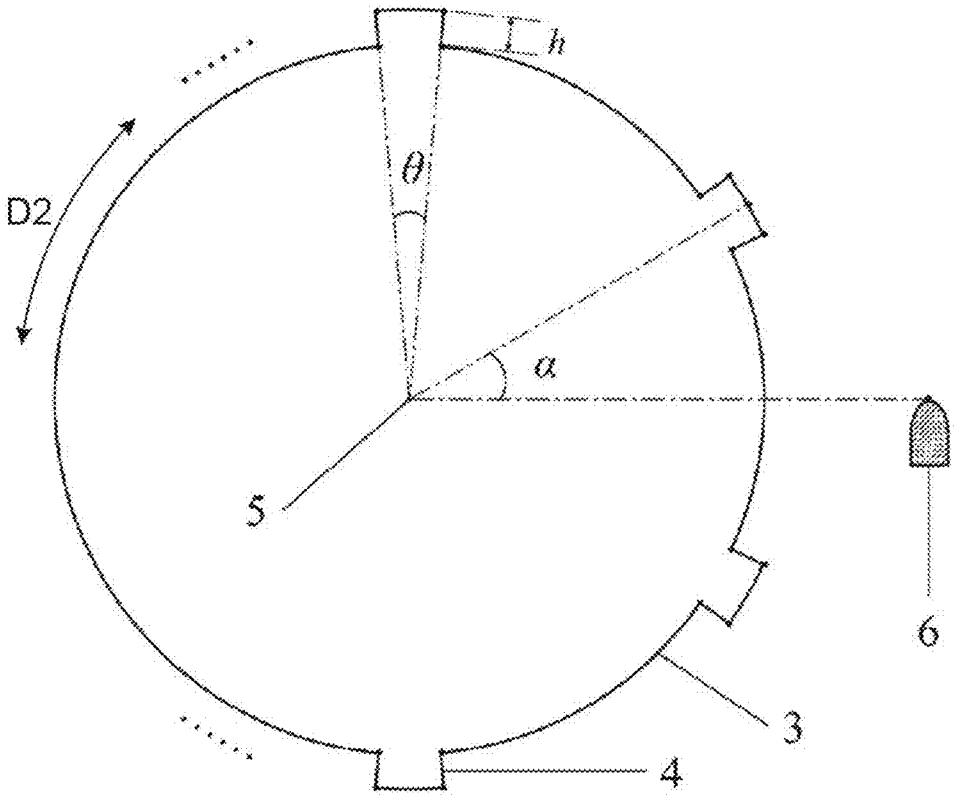
FIG. 2 is a schematic diagram illustrating a transverse cross-section of the turbine body of FIG. 1, taken along line A.

As illustrated in FIG. 2, a plurality of the inclined grooves 4 are evenly disposed in the circumferential direction, with a circumferential angle corresponding to their widths being θ, and an angle in the circumferential direction formed with a scroll tongue portion 6 being α. The groove 4 extends substantially in a radial direction of the axis of rotation 5 and further extends substantially in the axial direction D1, when viewed cross-sectionally, as illustrated in FIGS. 1 and 2.

Figure 3:
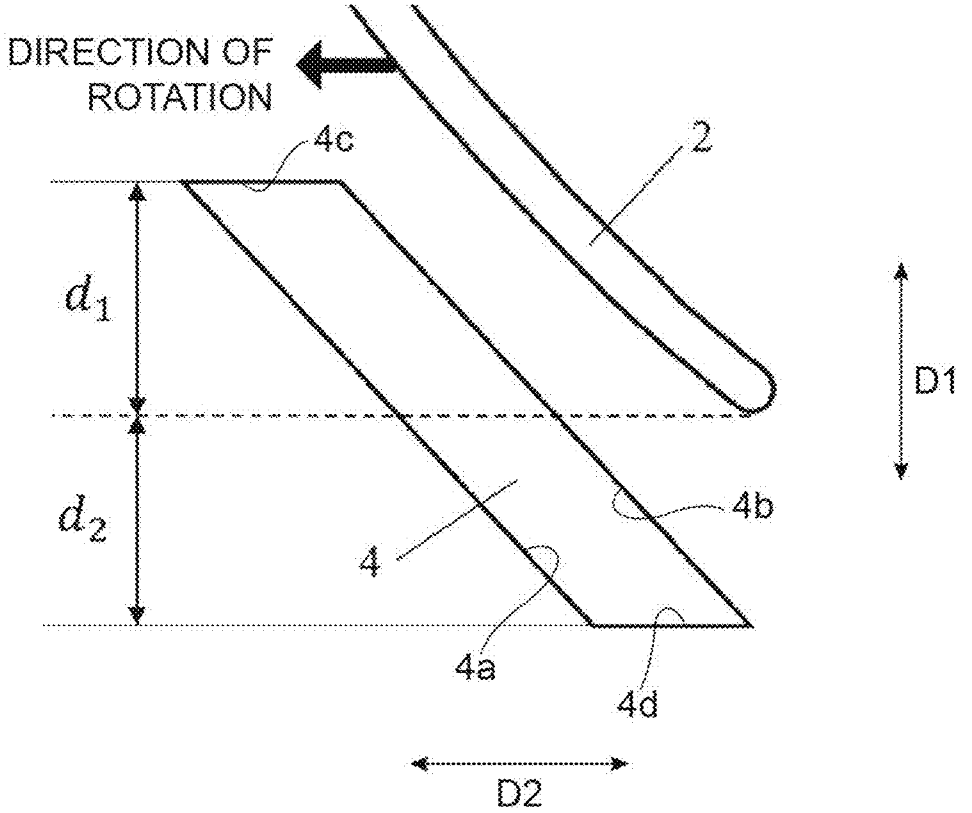
FIG. 3 is a schematic diagram illustrating a portion of the radial turbine blade adjacent to a groove of the housing.

In addition, when viewed in a radial direction as illustrated in FIG. 3, the groove 4 extends longitudinally at an angle with respect to an axial direction D1, in a direction that is substantially parallel to the blade 2. Namely, the angle of the groove 4 may be set to substantially match a pitch angle of the blade 2. For example, the groove 4 is formed between a pair of side walls 4*a*, 4*b* that face each other in the circumferential direction D2, and the pair of side walls 4*a*, 4*b* extend longitudinally at the set angle with respect to the axial direction D1. As illustrated in FIG. 3, the end portion of the blade 2 extends substantially parallel to the side walls 4*a*, 4*b* when the blade is located adjacent to the groove 4.

During the rotation of the impeller (or turbine rotor) 7, circumferential distortion of the flow field occurs at an outlet of the volute portion 1, causing significant fluctuations in the surface pressure on the blade 2 as it passes by the scroll tongue portion 6. The surface pressure on the blade 2 is also disturbed when the blade 2 passes by the inclined groove 4, and the number of disturbances per rotation is equal to the number of the inclined grooves 4. By adjusting the four parameters of $d_1$, $d_2$, h, and θ, the intensity of aerodynamic excitation generated by the inclined groove 4 can be controlled, so that it can be substantially the same as the intensity of excitation generated by the volute portion 1. By adjusting the number of the inclined grooves 4 and the angle α in the circumferential direction, the aerodynamic excitation forces generated by the volute portion 1 and the inclined grooves 4 will have opposite phases and cancel each other. This reduces the aerodynamic excitation force on the blade 2, and reduces the vibrational stress.

A specific example of the present disclosure has been described above. The present disclosure is not limited to the prescribed example described above, and a person skilled in the art can make various changes or alterations within the scope of the claims without affecting the essence of the present disclosure.

Figure 4:
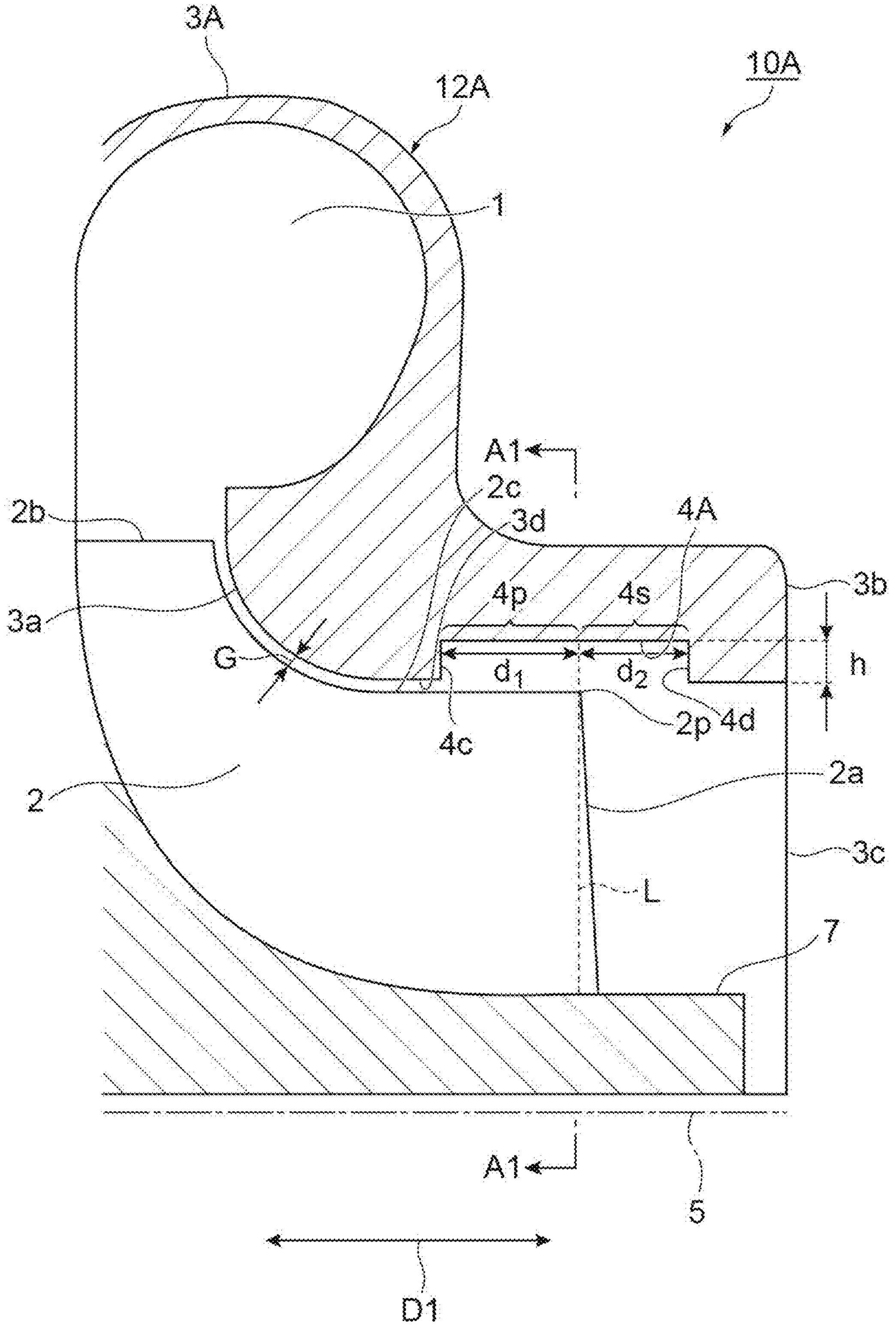
FIG. 4 is a schematic axial cross-sectional view of an example turbine body, illustrating a blade within a turbine housing.

A fluid machine 10A illustrated in FIG. 4 is a turbo machine such as a turbocharger, a general-purpose compressor, a pump, a gas turbine, or an aircraft engine, and includes at least a turbine (or turbine body) 12A. The turbine 12A includes, for example, a turbine housing 3A, and a turbine rotor 7 accommodated in the turbine housing 3A.

The turbine housing 3A includes, for example, a housing wall surface 3*a* and a housing end surface 3*b*. The housing wall surface 3*a* is an inner wall surface surrounding the turbine rotor 7. The housing end surface 3*b* is an end surface located at one end of the turbine housing 3A along an axial direction D1 along which the axis of rotation 5 of a rotating shaft to which the turbine rotor 7 is attached follows. The housing end surface 3*b* includes an opening 3*c* formed at a location facing the turbine rotor 7 accommodated in the turbine housing 3A in the axial direction D1. The housing wall surface 3*a* is connected to the housing end surface 3*b* via the opening 3*c*. The turbine housing 3A includes therein the volute portion 1 in which a scroll flow path is formed. The volute portion 1 is connected to the opening 3*c* of the housing end surface 3*b* via a flow path in which the turbine rotor 7 is disposed.

The turbine rotor 7 is attached to the rotating shaft of the fluid machine 10A, and rotates about the axis of rotation 5 of the rotating shaft. The turbine rotor 7 includes a plurality of blades 2 that are arranged around the axis of rotation 5. Each of the blades 2 includes a rear edge (trailing edge) 2*a*, a front edge (leading edge) 2*b*, and a side edge 2*c* as outer edges. The rear edge 2*a* is disposed closer to the opening 3*c* of the flow path inside the turbine housing 3A, and the front edge 2*b* is disposed closer to the volute portion 1 of the flow path. A rotation of the turbine rotor 7 causes the blades 2 to direct a fluid such as a gas, from the volute portion 1 toward the opening 3 of the housing 3A. Accordingly, the fluid is directed downstream from the leading edge 2*b* to the trailing edge 2*a* of the blade 2, in a flow direction of the fluid, by rotating the turbine rotor 7. The side edge 2*c* is the portion connecting the front edge 2*b* and the rear edge 2*a*, and faces the housing wall surface 3*a*. A height of the blade 2 increases from the front edge 2*b* to the rear edge 2*a*. The blade 2 includes a tip portion 2*p* as a portion with the maximum height, that is, a portion where the measurement of the blade taken in a normal direction to the side edge 2*c*, is the greatest. The tip portion 2*p* corresponds to a portion of the trailing edge 2*a* that is most distal from the axis of rotation 5. The tip portion 2*p* forms a connecting portion between the side edge 2*c* and the rear edge 2*a* of the blade 2. A clearance (or clearance distance) G is formed between the side edge 2*c* and the housing wall surface 3*a*. The clearance distance G is a gap formed between the side edge 2*c* and the housing wall surface 3*a*. The clearance distance G may, for example, be constant at locations along the side edge 2*c*. Alternatively, the space between the housing wall surface 3*a* and the side edge 2*c* may change along the side edge 2*c*. In this case, the gap at a location where the cross-sectional area of the flow path between the side edge 2*c* and the housing wall surface 3*a* is minimum is the size of the clearance G.

A plurality of grooves 4A are formed in the housing wall surface 3*a*. In some examples, the grooves 4A extend in the axial direction D1. The grooves 4A being formed means that two or more grooves 4A independent from each other are formed, which does not include a case where only one groove 4A is formed. That is, when the number of the grooves 4A is represented by N, N is set to a natural number of 2 or more. This example exemplifies a case in which four grooves 4A are formed in the housing wall surface 3*a*. The number of the grooves 4A is not limited to four, and may be two, three, or five or more. Each groove 4A is, for example, a slit formed so as to extend linearly in the housing wall surface 3*a*. The grooves 4A are arranged along a circumferential direction D2 in the housing wall surface 3*a*.

Each groove 4A intermittently faces the blade 2 when the turbine rotor 7 rotates. Namely, each groove 4A includes at least a groove portion (or first portion) 4*p* that is disposed at a location capable of facing the blade 2. The groove portion 4*p* may be a part of the groove 4A, or may be the entire groove 4A. The groove portion 4*p* being capable of facing the blade 2 means that the groove portion 4*p* is disposed at a location facing a rotation track of the blade 2 that rotates about the axis of rotation 5, in that groove portion 4*p* intermittently faces the blade 2 when the turbine rotor 7 rotates. Consequently, the groove portion 4*p* being disposed at a location capable of facing the blade 2 includes a case where the groove portion 4*p* is disposed so as to face the rotation track of the blade 2 along the normal line of the housing wall surface 3*a*, that is, a case where the groove portion 4*p* is disposed so as to overlap the rotation track of the blade 2 along the normal direction of the housing wall surface 3*a*.

The groove portion 4*p*, for example, faces the tip portion 2*p* of the blade 2. Namely, the groove 4A intermittently faces the trailing edge 2*a* of the blade 2 when the turbine rotor 7 rotates. The groove 4A is formed continuously from a portion of the housing wall surface 3*a* facing the tip portion 2*p* to a location that does not reach the housing end surface 3*b*. Namely, the groove 4A extends longitudinally between closed end walls 4*c*, 4*d* that extend radially outwardly from an inner circumference 3*d* of the inner wall surface 3*a*. Consequently, in this example, the groove portion 4*p* is formed at a location separated from the housing end surface 3*b* in the axial direction D1. It should be noted that the groove 4A may be an inclined groove extending in a direction parallel to a direction of extension of the blade 2, similarly to the examples described above with reference to FIGS. 1 and 3.

A depth (height) h of the groove 4A from the housing wall surface 3*a* may be greater or less than the clearance distance G taken between the housing wall surface 3*a* and the tip portion 2*p* of the blade 2. Namely, the clearance distance G may correspond to a closest distance between the inner wall surface 3*a* and the blade 2, for example between the inner circumference 3*d* of the inner wall surface 3*a* and the side edge 2*c* of the blade 2. In a cross-section of the turbine 12A including the axis of rotation 5 (cross-section of FIG. 4), in a case where a boundary line L (dotted line in FIG. 4) that passes the tip portion 2*p* of the blade 2 and is perpendicular to the axis of rotation 5 is drawn, the length in the axial direction D1 of a portion (or first portion) 4*p* of the groove 4A upstream of the boundary line L is $d_1$, and the length in the axial direction D1 of a portion (or second portion) 4*s* of the groove 4A downstream of the boundary line L is $d_2$. For example, the upstream portion 4*p* from the tip end 2*p* of the blade 2 to the upstream end wall 4*c*, and the downstream portion 4*s* extends from the tip end 2*p* to the downstream end wall 4*d*, in the flow direction of the fluid, when the blade 2 faces the groove 4A. In this case, the length $d_1$ may be greater or less than the length $d_2$. It should be noted that downstream refers to a direction in the flow path in which the turbine rotor 7 is disposed, from the volute portion 1 toward the opening 3*c*, and upstream refers to the opposite direction (i.e., from the opening 3*c* toward the volute portion 1).

Figure 5:
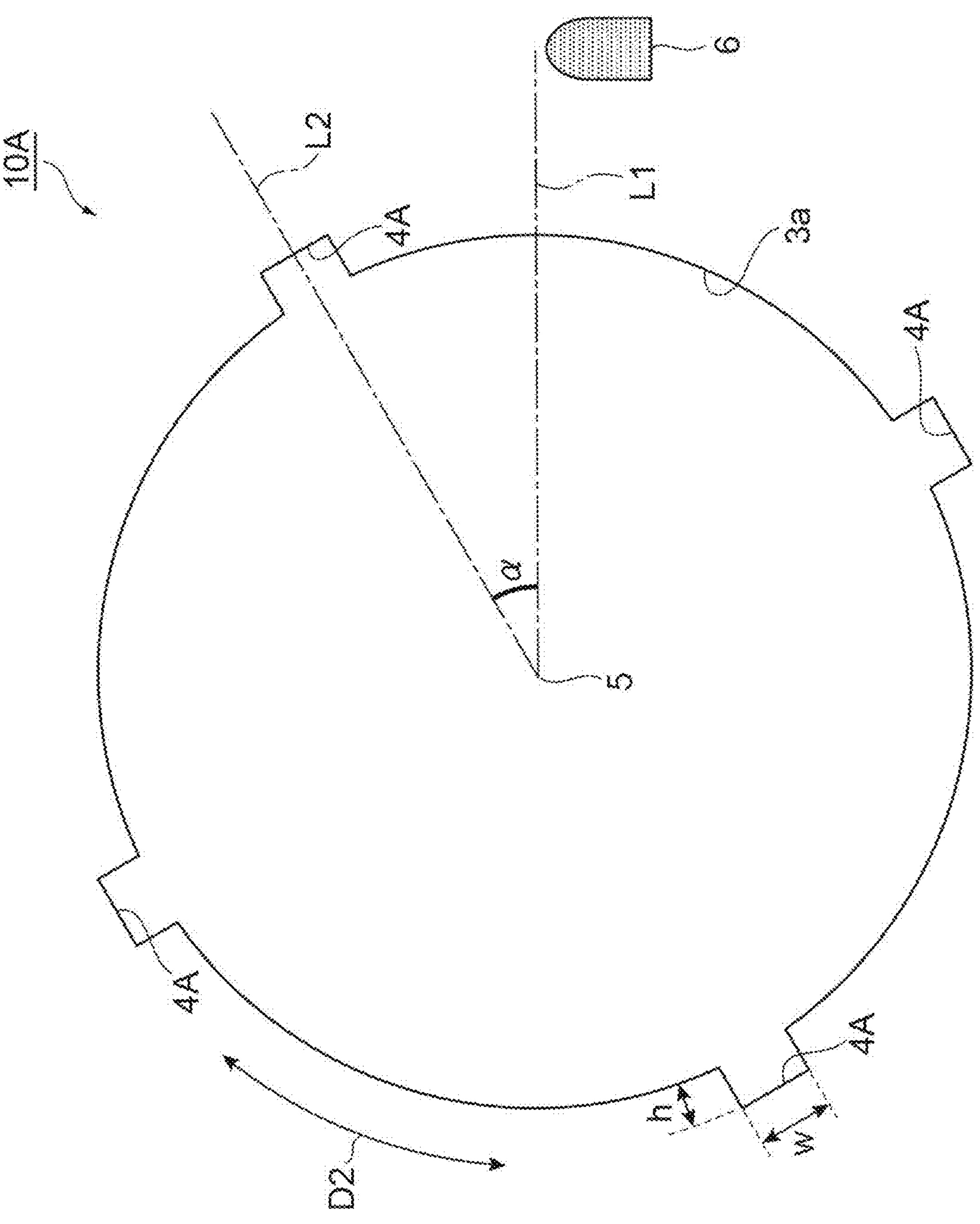
FIG. 5 is a schematic diagram illustrating a transverse cross-sectional view of the turbine housing of FIG. 4, taken along line A1-A1, relative to a scroll tongue portion.

FIG. 5 illustrates a cross-section of the housing wall surface 3*a* of the turbine housing 3A at a plane perpendicular to the axis of rotation 5. As illustrated in FIG. 5, the grooves 4A are, for example, arranged equally spaced apart along the circumferential direction D2. One or more of the grooves 4A may be disposed at locations offset from the equally spaced positions along the circumferential direction D2. The grooves 4A have, for example, a rectangular shape in the cross-section of FIG. 5. A pair of side surfaces forming the groove 4A may be formed perpendicular to a bottom surface of the groove 4A, or may be formed so as to be inclined with respect to the bottom surface of the groove 4A. The shape of the grooves 4A need not necessarily be rectangular, and may, for example, be semicircular, triangular, or any other polygonal shape.

In the cross-section of FIG. 5, the locations of the grooves 4A in the circumferential direction D2 can be defined with reference to a reference line L1 that passes a tip end of a tongue portion 6 of the turbine housing 3A and the axis of rotation 5. The tongue portion 6 is formed by a portion that defines a winding end of the scroll flow path of the turbine housing 3A. In the cross-section of FIG. 5, for example, in a case where a radial line L2 connecting the axis of rotation 5 and the center of the bottom surface of the groove 4A is drawn, the location of the groove 4A in the circumferential direction D2 can be defined by the angle α between the reference line L1 and the radial line L2. Each groove 4A may be formed, for example, at a location that is line-symmetrical with respect to the reference line L1, or at a location that is non-line-symmetrical with respect to the reference line L1, depending on examples. For example, in FIG. 5, the line L1 extends in the radial direction between two adjacent grooves 4A. As the line L1 is offset from an angular center between the two adjacent grooves 4A, the locations of the grooves 4A are non-line-symmetrical with respect to the line L1.

A width w of the groove 4A in the circumferential direction D2 can be defined by a space in the circumferential direction D2 between the pair of the side surfaces forming the groove 4A. The width w of the groove 4A is, for example, greater than the depth h of the groove 4A, taken from the inner circumference 3*d* of the inner wall surface 3*a*, in a radial direction of the axis of rotation 5. The width w of the groove 4A can also be defined by an angle formed by a pair of circumferential lines connecting the axis of rotation 5 and the pair of side surfaces of the groove 4A.

The effects produced by the fluid machine 10A described above will now be described together with the problem of the conventional technology.

In general, an excitation force at a frequency that is n times the rotational frequency, with n being a natural number, (e.g., may be referred to as "nEO") can act on a rotating blade of a fluid machine such as a turbo machine. When the frequency of the excitation force matches the natural frequency of the rotating blade, the rotating blade enters a resonant state. In this case, the rotating blade may experience fatigue failure due to the occurrence of repeated stress. The frequency of the excitation force that can lead to fatigue failure can be determined through empirical rules, actual measurements, and the like. Typically, it is fundamental to design such that the frequency of the excitation force does not match the natural frequency of the rotating blade (detuning). In a case where no design compromises can be found and it is difficult to avoid the occurrence of resonance by the detuning above, the operating pressure of the turbo machine may be suppressed so that the excitation force does not lead to fatigue failure.

However, the detuning above leads to limitations on the operating rotational speed of the turbo machine and restrictions, such as not being able to freely determine the shape of the rotating blade, which may result in the degradation of the inherent fluid dynamic functions of the turbo machine. The same can also be said when suppressing the operating pressure of the turbo machine.

In contrast, in the fluid machine 10A according to some examples, the grooves 4A are formed in the housing wall surface 3*a*, and at least a portion (groove portion 4*p*) of each of the grooves 4A is disposed at a location capable of facing the blade 2. Consequently, the grooves 4A are present in the portion of the housing wall surface 3*a* where the blade 2 passes. In the case where such grooves 4A are formed in the housing wall surface 3*a*, an excitation force that is different from the excitation force originally acting on the turbine rotor 7 is generated by the grooves 4A.

The phase of the excitation force generated by the grooves 4A can be adjusted by changing the angle α, which indicates the locations of the grooves 4A in the circumferential direction D2. Additionally, the magnitude of the excitation force generated by the grooves 4A can be adjusted by changing the depth and width of the grooves 4A. Consequently, by configuring the grooves 4A so that the excitation force is equal in magnitude and opposite in phase to the excitation force originally acting on the turbine rotor 7 by adjusting the parameters such as the location in the circumferential direction D2 (angle α), the depth h, and the width w of the grooves 4A, it is possible to enable the grooves 4A to generate an excitation force that can cancel the vibration caused by the excitation force originally acting on the turbine rotor 7. Even if there is some discrepancy in magnitude or phase between the excitation force originally acting on the turbine rotor 7 and the excitation force generated by the grooves 4A, it is still possible to at least reduce the force causing the turbine rotor 7 to vibrate.

In a case where N grooves 4A are formed in the housing wall surface 3*a*, it is possible to significantly reduce nEO, which is the excitation force having a frequency n times the rotational frequency. For example, in a case where four grooves 4A are formed in the housing wall surface 3*a*, it is possible to significantly reduce 4EO. In a case where five grooves 4A are formed in the housing wall surface 3*a*, it is possible to significantly reduce 5EO. In the fluid machine 10A, vibrations such as 4EO or 5EO can particularly have a significant impact on performance degradation. Therefore, if such excitation force can be reduced by forming N grooves 4A, it is possible to suppress the degradation of the function of the fluid machine 10A due to the effects of vibration.

Figure 6:
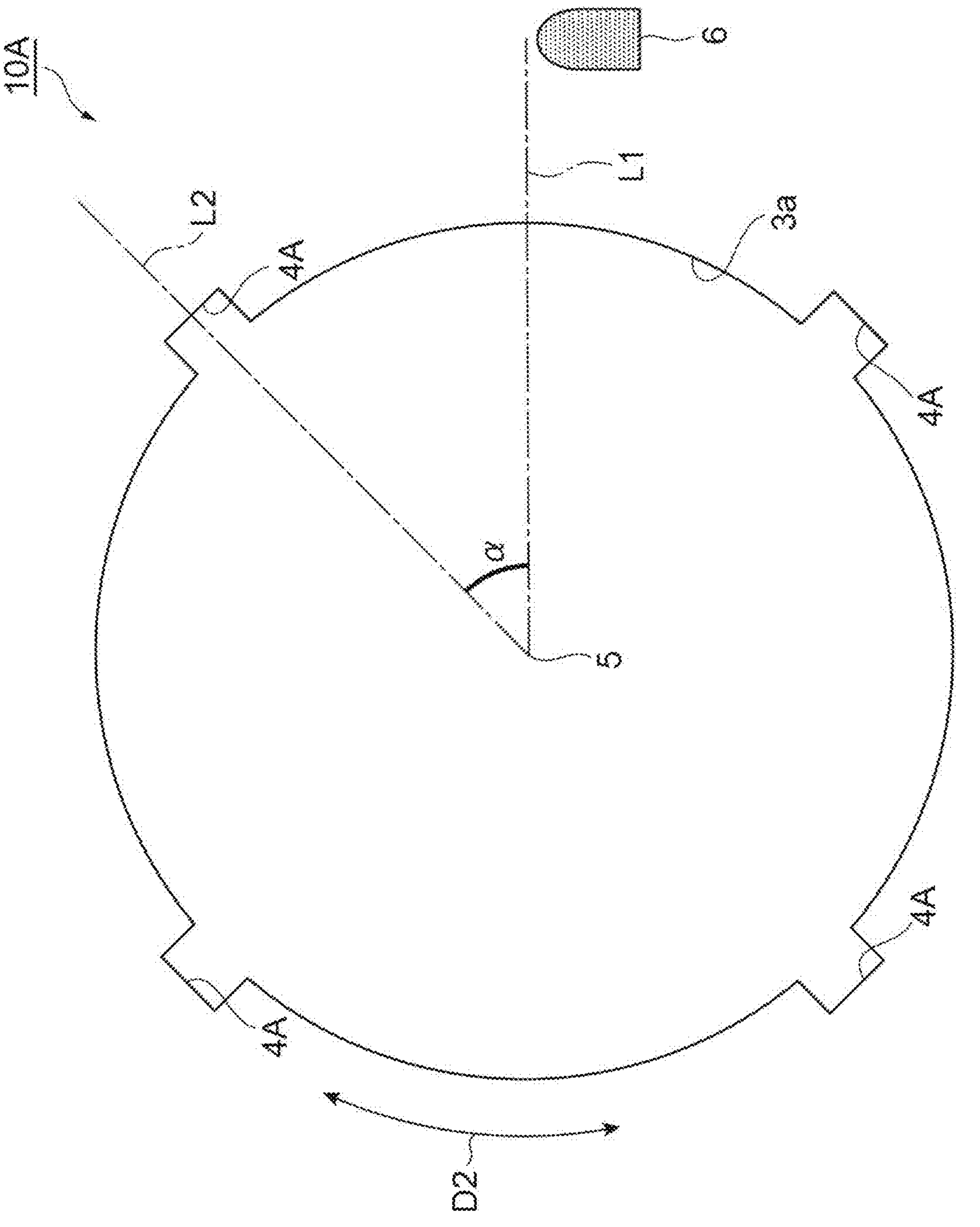
FIG. 6 is a schematic diagram illustrating a transverse cross-sectional view of a turbine housing relative to a scroll tongue portion, according to an example.

FIG. 6 illustrates a cross-sectional view of the housing wall surface 3*a* in a case where the angle α indicating the locations of the grooves 4A of the fluid machine 10A in the circumferential direction D2 is 45 degrees. In the example illustrated in FIG. 6, four grooves 4A are formed so that they are arranged equally spaced apart along the circumferential direction D2, and they are in line symmetry with respect to the reference line L1 that connects the tip end of the tongue portion 6 and the axis of rotation 5. Namely, the tip end of the tongue portion 6 is located at an angular center in the circumferential direction D2, between two adjacent grooves 4A.

Figure 7:
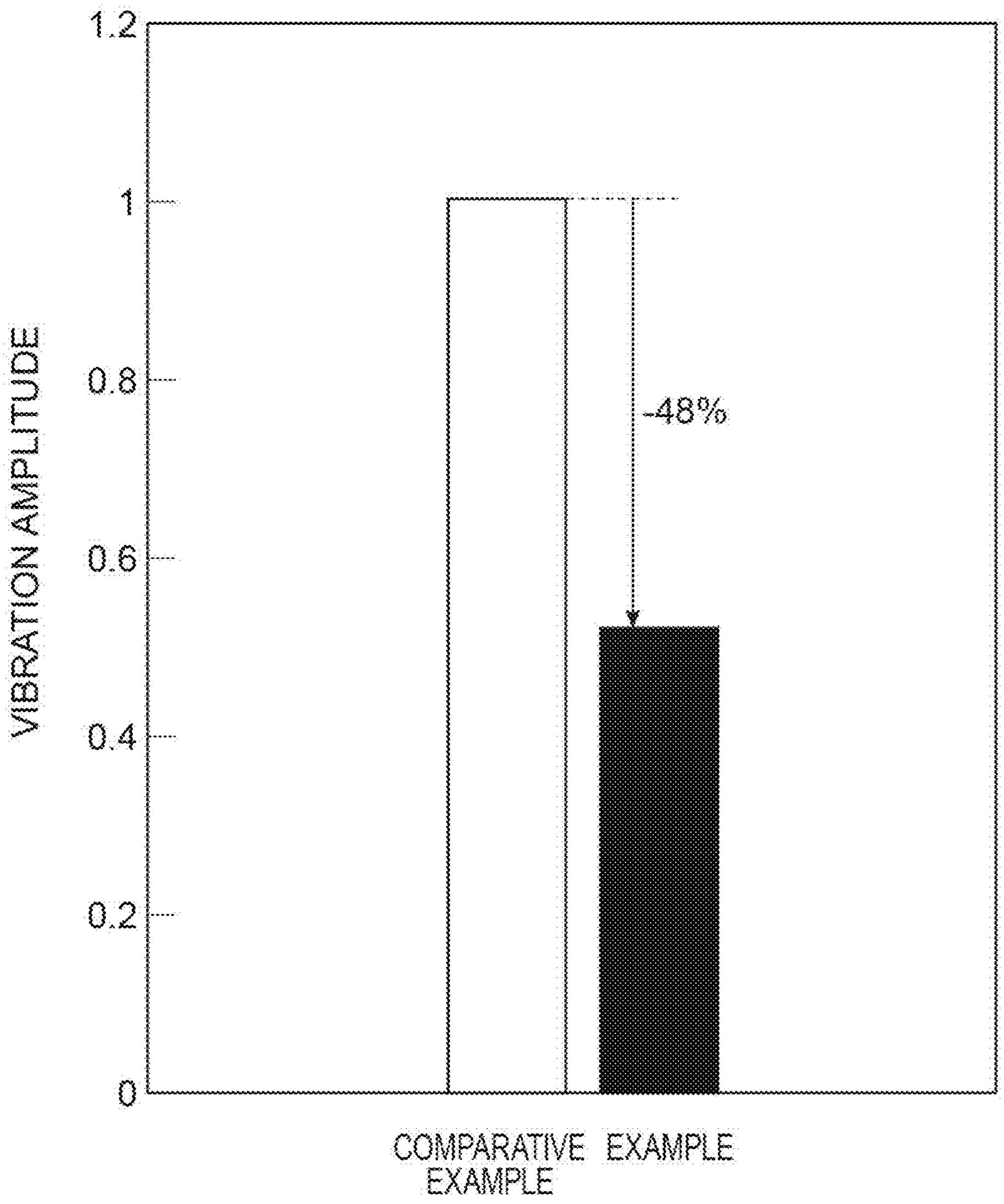
FIG. 7 is a graph of vibration amplitudes of example turbine bodies.

FIG. 7 illustrates the experimental result comparing the amplitude of vibration (vibration amplitude) acting on the turbine rotor 7 of the fluid machine 10A of the example of FIG. 6 with the amplitude of vibration (vibration amplitude) acting on the turbine rotor 7 of the fluid machine of a comparative example. In FIG. 7, the vibration amplitude is shown as a standardized value. As described above, the grooves 4A are formed in the housing wall surface 3*a* of the fluid machine 10A of the example. In contrast, no configurations corresponding to such grooves are formed in the housing wall surface of the fluid machine of the comparative example. That is, the difference between the example of FIG. 6 and the comparative example lies in the presence or absence of grooves in the housing wall surface 3*a*, with the same turbine rotor 7 being used in both cases. The housing wall surface of the comparative example has a tubular shape rotationally symmetrical with respect to the axis of rotation 5. The experimental result is based on rotating the turbine rotor 7 of the example of FIG. 6 and the comparative example at a predetermined rotational speed. At this rotational speed, the excitation of 4EO is dominant. As illustrated in FIG. 7, the example fluid machine 10A achieves a 48% reduction in vibration amplitude compared to the fluid machine of the comparative example. The result indicates that the example fluid machine 10A can significantly reduce the vibration acting on the turbine rotor 7 through the formation of the grooves 4A. That is, the excitation of nEO in which n corresponds to the number of the grooves 4A, is significantly reduced relative to the comparative example. According to the analysis, the reduction rate of excitations other than the rated nEO, such as the excitation of (n+1)EO, is less than that of nEO.

It is to be understood that not all aspects, advantages and features described herein may necessarily be achieved by, or included in, any one particular example. Indeed, having described and illustrated various examples herein, it should be apparent that other examples may be modified in arrangement and detail.

Figure 8:
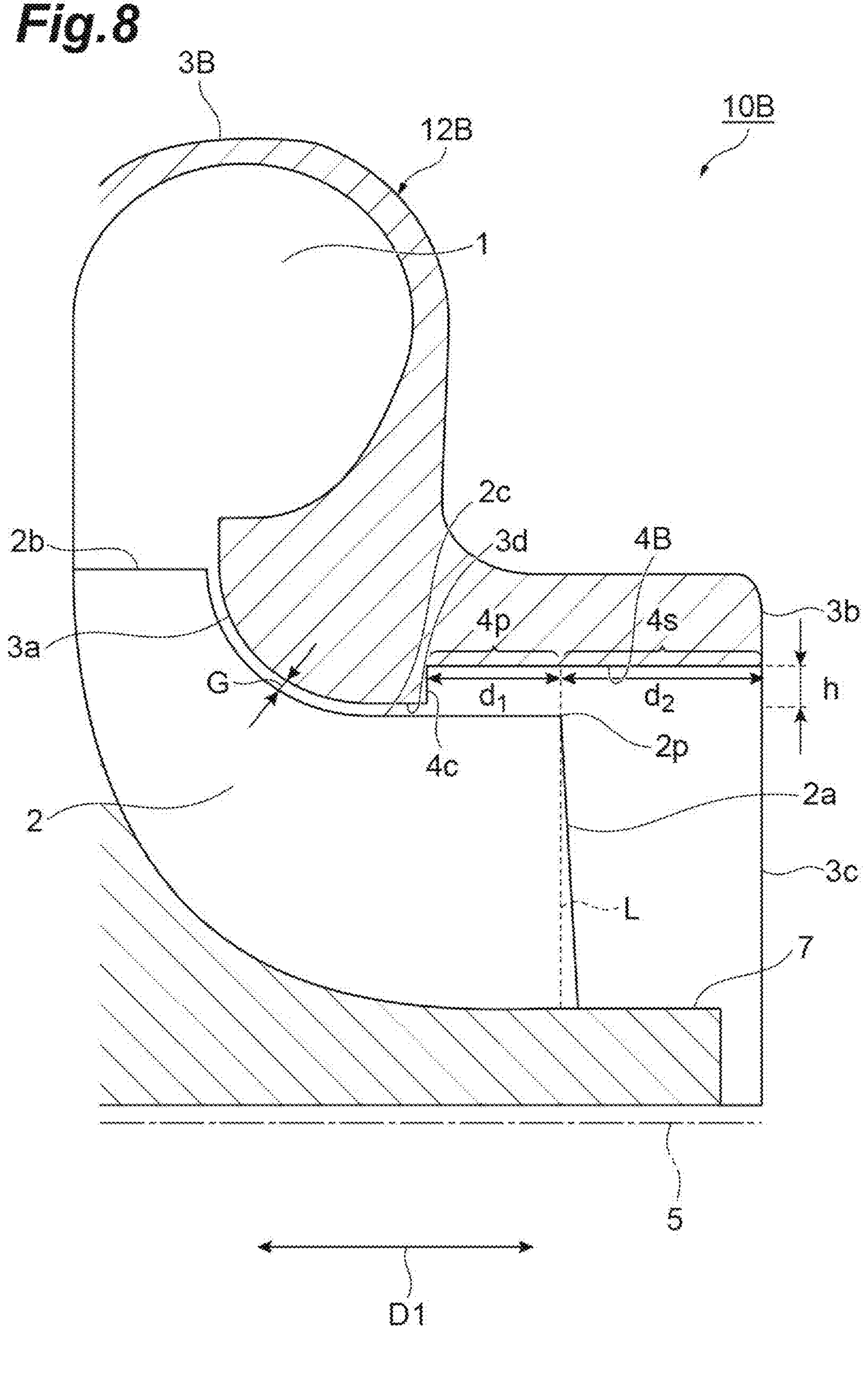
FIG. 8 is a schematic axial cross-sectional view of an example turbine body.

For example, with reference to FIG. 8, in an example turbine (or turbine body) 12B of a fluid machine 10B, a groove 4B may extend continuously from the portion of the housing wall surface 3*a* of a turbine housing 3B that faces the blade 2 to the housing end surface 3*b*. The portion 4*s* of the groove 4B, other than the groove portion 4*p* that faces the blade 2, does not significantly affect the vibration of the turbine rotor 7. That is, a length $d_2$ of the groove 4B is not a parameter that significantly affects the vibration of the turbine rotor 7. Therefore, in the example illustrated in FIG. 8, the portion 4*s* of the groove 4B is longer than the portion 4*p* of the groove 4B in the axial direction D. The groove 4B is formed continuously to reach the housing end surface 3*b* in the housing wall surface 3*a* from the perspective of facilitating the formation of the groove 4B. This makes it possible to easily form the groove 4B from the opening 3*c* of the housing end surface 3*b*.

Figure 9:
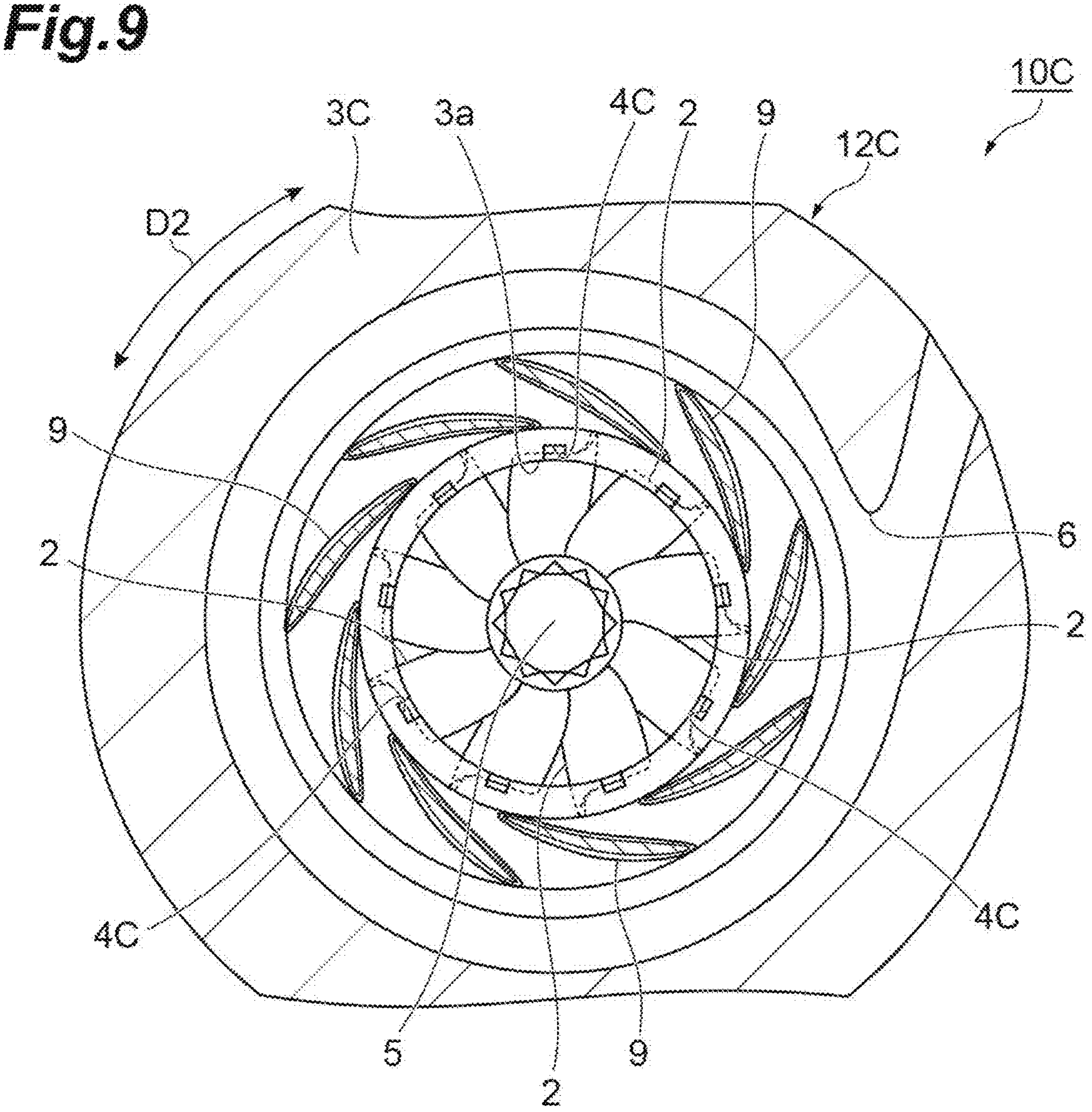
FIG. 9 is a schematic transverse cross-sectional view of an example turbine housing.

With reference to FIG. 9, in an example turbine (or turbine body) 12C of a fluid machine 10C, a plurality of grooves 4C may be formed inside a turbine housing 3C so as to correspond one-to-one with a plurality of nozzle vanes 9 disposed around the turbine rotor 7. It should be noted that FIG. 9 illustrates a part of the turbine 12C as a cross-section. In the example illustrated in FIG. 9, the number of the grooves 4C is the same as the number of the nozzle vanes 9. Each nozzle vane 9 forms a flow path that guides fluid to the turbine rotor 7. The nozzle vanes 9 are, for example, disposed equally spaced apart along the circumferential direction D2 about the axis of rotation 5. The excitation force of the fluid from the nozzle vanes 9 can be effectively suppressed by the grooves 4C being formed corresponding one-to-one with the nozzle vanes 9 as in the turbine 12C. In other examples, the number of the grooves may be different from the number of the nozzle vanes.

The present disclosure is not limited to the examples and variations described above, and other various variations are possible. For example, each of the examples and variations described above can be combined according to the required objective and effect.

The present disclosure includes the following configurations.

The flow control method of a configuration [1] may be described as "a flow control method for suppressing a vibration of a radial turbine blade on the basis of a wall surface grooving treatment performing a grooving treatment on a housing wall surface of a radial turbine to suppress vibrational stress of blade resonance."

The flow control method of a configuration [2] may be described as "the flow control method for suppressing a vibration of a radial turbine blade on the basis of a wall surface grooving treatment according to the configuration [1], wherein a groove formed in a housing is an inclined groove, a direction of the inclined groove being parallel to a blade, and the inclined groove being located in the vicinity of a trailing edge of the blade."

The flow control method of a configuration [3] may be described as "the flow control method for suppressing a vibration of a radial turbine blade on the basis of a wall surface grooving treatment according to the configuration [1] or [2], wherein a plurality of the inclined grooves are evenly disposed in a circumferential direction."

The flow control method of a configuration [4] may be described as "the flow control method for suppressing a vibration of a radial turbine blade on the basis of a wall surface grooving treatment according to any one of the configurations [1] to [3], wherein a dimension parameter of each of the inclined grooves is adjusted such that an intensity of an aerodynamic excitation force generated by each of the inclined grooves is substantially the same as an intensity of an aerodynamic excitation force generated by a volute."

The flow control method of a configuration [5] may be described as "the flow control method for suppressing a vibration of a radial turbine blade on the basis of a wall surface grooving treatment according to any one of the configurations [1] to [4], wherein the number of the inclined grooves and a relative location between each of the inclined grooves and the volute are adjusted such that the aerodynamic excitation forces generated by the volute and each of the inclined grooves have opposite phases and cancel each other."

The fluid machine of a configuration [6] may be described as "a fluid machine including: a housing including an inner wall surface surrounding a turbine rotor, wherein the inner wall surface has a plurality of grooves arranged along a circumferential direction of an axis of rotation of the turbine rotor, and wherein at least a portion of each of the grooves is disposed at a location capable of facing a blade of the turbine rotor."

The fluid machine of a configuration [7] may be described as "the fluid machine according to the configuration [6], further including a plurality of nozzle vanes disposed around the turbine rotor, wherein the number of the grooves is the same as the number of the nozzle vanes."

The fluid machine of a configuration [8] may be described as "the fluid machine according to the configuration [6] or [7], wherein the housing includes an end surface located at one end in an axial direction in which the axis of rotation extends, wherein the end surface includes an opening formed at a location facing the turbine rotor in the axial direction and is connected to the inner wall surface via the opening, and wherein the grooves are formed continuously from a portion of the inner wall surface facing the blade to the end surface."

The fluid machine of a configuration [9] may be described as "the fluid machine according to any one of the configurations [6] to [8], wherein a depth of the grooves from the inner wall surface is less than a clearance between the inner wall surface and an outer edge of the blade."

The invention claimed is:

1. A turbine body comprising:

a turbine rotor including a blade configured to rotate around an axis of rotation of the turbine rotor, wherein during a rotation of the turbine rotor, a fluid is directed from a leading edge of the blade toward a trailing edge of the blade, and wherein the blade is imparted with a first excitation force in response to the rotation of the turbine rotor; and a housing including an inner wall surface surrounding the turbine rotor, wherein the inner wall surface has a plurality of grooves arranged along a circumferential direction of the axis of rotation of the turbine rotor, wherein each groove among the plurality of grooves is positioned to intermittently face the trailing edge of the blade when the turbine rotor rotates, to generate a second excitation force that suppresses the first excitation force, and wherein each groove extends substantially in a radial direction of the axis of rotation, and further extends longitudinally at a non-zero angle with respect to an axial direction of the turbine rotor, the non-zero angle substantially matching a pitch angle of the blade.

2. The turbine body according to claim 1, wherein the grooves extend within a portion of the inner wall surface that extends in the axial direction of the turbine rotor, parallel to the axis of rotation.

3. The turbine body according to claim 1, wherein a groove selected from the plurality of grooves, includes a first portion that is located upstream of the trailing edge of the blade and a second portion that is located downstream of the trailing edge, in a flow direction of the fluid.

4. The turbine body according to claim 3, wherein the second portion is longer than the first portion of the groove, in the axial direction of the turbine rotor.

5. The turbine body according to claim 3, wherein the trailing edge of the blade extends away from the axis of rotation in the radial direction of the axis of rotation, to a tip end that is adjacent to the inner wall surface, and wherein the first portion extends upstream from the tip end and the second portion extends downstream from the tip end, in the flow direction of the fluid, when the blade faces the groove.

6. The turbine body according to claim 3, wherein the first portion extends upstream from the second portion in the flow direction of the fluid, to a closed end wall of the groove that extends in the radial direction of the axis of rotation.

7. The turbine body according to claim 3, wherein the inner wall surface extends in the axial direction of the turbine rotor, to an open end of the housing, and wherein the second portion of the groove extends to the open end.

8. The turbine body according to claim 1, wherein the housing includes an end surface located at one end in the axial direction of the turbine rotor, wherein the end surface includes an opening from which the inner wall surface extends in the axial direction of the turbine rotor, and wherein the grooves extend continuously in the axial direction of the turbine rotor, to the end surface of the housing.

9. The turbine body according to claim 1, wherein a depth of the grooves taken in the radial direction of the axis of rotation, from an inner circumference of the inner wall surface, is less than a clearance distance between the inner circumference of the inner wall surface and an outer edge of the blade.

10. The turbine body according to claim 1, wherein a groove selected from the plurality of grooves has a width in the circumferential direction of the turbine rotor, that is greater than a depth of the groove taken from an inner circumference of the inner wall surface, in the radial direction of the axis of rotation.

11. The turbine body according to claim 1, wherein a groove selected from the plurality of grooves has a length in the axial direction of the turbine rotor, and wherein the groove is open to the turbine rotor along the entire length of the groove.

12. The turbine body according to claim 1, wherein each groove is formed between a pair of side walls that face each other in the circumferential direction, wherein the pair of side walls extend longitudinally at the non-zero angle with respect to the axial direction of the turbine rotor, and wherein the blade extends substantially parallel to the side walls when the blade is located adjacent to the groove.

13. The turbine body according to claim 1, further comprising a number of nozzle vanes disposed around the turbine rotor, wherein a number of the grooves is equal to the number of nozzle vanes.

14. The turbine body according to claim 1, further comprising a volute portion formed by the housing of the turbine body, wherein the plurality of grooves are arranged at equal distances in the circumferential direction, wherein the volute portion forms a scroll flow path having a winding end that forms a tongue portion, and wherein a tip end of the tongue portion is located at an angular center in the circumferential direction, between two adjacent grooves among the plurality of grooves.

15. The turbine body according to claim 1, wherein each groove intermittently faces the trailing edge of the blade, in the radial direction of the axis of rotation, during the rotation of the turbine rotor.

16. A vibration suppression method in a turbine body, comprising:

rotating a turbine rotor of the turbine body around an axis of rotation, wherein the turbine body includes an inner housing surface including one or more grooves, and wherein the inner housing surface extends in an axial direction of the turbine rotor;

applying a first excitation force to a rotating blade of the turbine rotor in response to a rotation of the turbine rotor, wherein each of the one or more grooves extends substantially in a radial direction of the axis of rotation, and further extends longitudinally at a non-zero angle with respect to the axial direction of the turbine rotor, wherein the non-zero angle substantially matches a pitch angle of the rotating blade, and wherein the one or more grooves intermittently face the rotating blade during the rotation of the turbine rotor; and generating a second excitation force in response to the rotating blade passing by the one or more grooves, wherein the second excitation force has a phase that is different from a phase of the first excitation force to suppress a resonant state of the rotating blade.

17. The vibration suppression method according to claim 16, wherein the second excitation force has a magnitude that is substantially equal to a magnitude of the first excitation force, and wherein the phase of the second excitation force is opposite to the phase of the first excitation force, to substantially cancel the first excitation force.

18. The vibration suppression method according to claim 16, further comprising directing a fluid from a volute portion formed by a housing of the turbine body, to an opening of the housing, via the rotating blade, wherein the first excitation force is generated by the volute portion.

19. The vibration suppression method according to claim 18, wherein the fluid is directed from a leading edge of the blade adjacent to the volute portion, toward a trailing edge of the blade adjacent to the opening of the housing, via the rotating blade, wherein the one or more grooves of the inner housing surface correspond to a plurality of grooves that are arranged at equal distances, in a circumferential direction of the axis of rotation of the turbine rotor, and wherein the plurality of grooves intermittently face the trailing edge of the rotating blade during the rotation of the turbine rotor.

20. The vibration suppression method according to claim 19, wherein the one or more grooves intermittently face the trailing edge of the rotating blade, in the radial direction of the axis of rotation, during the rotation of the turbine rotor.

* * * * *